Aug. 25, 1942.   W. S. POTTER   2,293,949
ALTIMETER
Filed Aug. 14, 1937
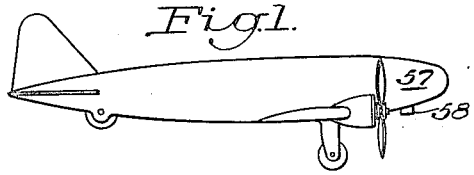
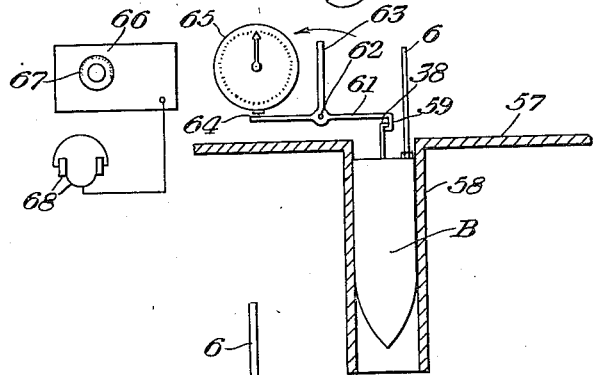
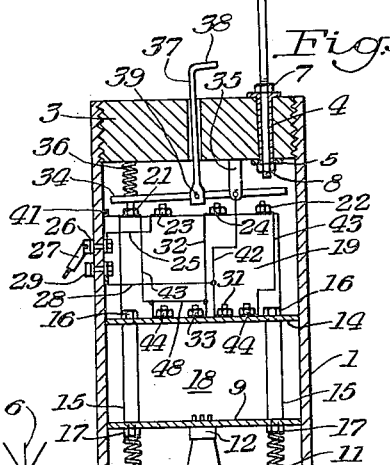
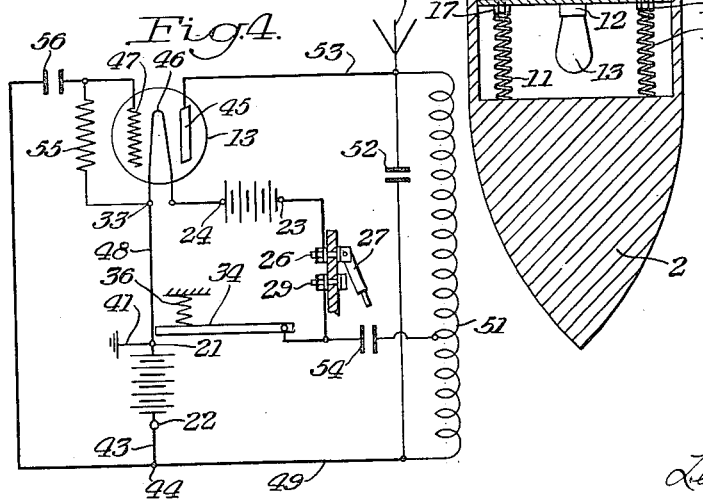
INVENTOR
William S. Potter.
BY
Lewis D. Konigsford
ATTORNEY Patented Aug. 25, 1942

2,293,949

UNITED STATES PATENT OFFICE 2,293,949

ALTIMETER

William S. Potter, Edgewood, Pa., assignor to Pittsburgh Equitable Meter Company, Pittsburgh, Pa., a corporation of Pennsylvania Application August 14, 1937, Serial No. 159,138

11 Claims. (Cl. 250—1)

This invention relates to altimeters for determining the altitude of an aeroplane above the earth relative to a point substantially directly underneath the aeroplane. The invention is applicable to commercial or military aviation for determining the altitude of an aeroplane in flight or for correcting the barometer reading, and also may be employed in military aviation for determining altitude in connection with bombing operations.

The present system in use for determining altitude of an aeroplane is based on the barometric pressure which advises the aviator as to his altitude above sea level, and frequent corrections have to be made for variations in barometric pressure at a base point. The barometric pressure method of determining altitude does not advise the aviator of the presence of mountains, as it does not give him his altitude with relation to the earth's surface directly beneath him. Furthermore, on long flights, especially over water, the barometric correction at the base point may not be the same as the correction to be applied at the location of the aeroplane in flight, and consequently, during blind flying, a serious error may occur in the calculation of the altitude of the aeroplane.

The present invention has for its object the determining of the altitude of an aeroplane over water or land relative to a point on the earth's surface substantially directly underneath so that the pilot can determine whether he is flying at a safe distance above the ground.

A further object is the provision of an altimeter which when dropped from the aeroplane sends out a radio frequency signal until the altimeter reaches the earth, whereupon the signal ceases, and the aviator can determine his altitude from the duration of the signal according to tables compiled from experimental data.

A further object is the provision of an altimeter device which falls rapidly with a minimum of air resistance and sends out a signal while it is falling which ceases when the earth's surface is reached so that the duration of the signal is substantially proportional to the distance of fall.

These and other objects of the invention will be apparent from a consideration of the accompanying drawing showing a preferred embodiment of the invention taken in connection with the annexed specification, and wherein:

Figure 1 represents an aeroplane flying at an altitude above the earth and equipped with my improved altimeter;

Figure 2 diagrammatically illustrates the arrangement of the altimeter and the signal receiving apparatus in the cockpit of the aeroplane;

Figure 3 is a longitudinal section view through the altimeter bomb, and

Figure 4 shows a preferred modification of a radio frequency sending circuit.

Referring to the drawing, the altimeter bomb B comprises an external hollow casing 1 having a massive nose 2 that is closed at its upper end by a plug 3 which may be threaded into the casing 1. The shape of the casing preferably is cylindrical with a pointed nose so that in falling the bomb will offer the least air resistance, and if desired, a tail may be placed on the bomb to keep it falling nose down. The plug 3 is bored and receives a flanged insulation bushing 4 held in place by a nut 5, and an antennae 6 in the form of a rod is secured in the bushing by the nuts 7 and 8. Within the bomb is located a plate 9 which is supported by four springs 11, and carries a vacuum tube socket 12 receiving a suitable triode vacuum tube 13 forming part of the sending circuit. A second plate 14 is secured to the plate 9 by suitable spacers 15 held in position by nuts 16 and 17 to provide a compartment 18 for receiving the parts of the radio transmitting system. The plate 14 supports a battery indicated at 19 which has the terminals 21 and 22, and the filament heating terminals 23 and 24. Wire 25 connects terminal 23 with the binding post 26 extending through the wall of the bomb and insulated therefrom, and which has a knife switch blade 27 pivoted thereto, and a wire 28 connects similar binding post 29, which receives the blade 27, with the binding post 31. A wire 32 connects battery terminal 24 with the transmitter terminal 33. Switch blade 27 is connected across binding posts 26 and 29 on the exterior of the bomb when the device is operating.

A switch bar 34 is secured on a pivot 35 supported on the threaded plug 3, and a spring 36 between the switch bar 34 and plug 3 urges one end of the bar downwardly toward the battery terminal 21. A rod 37 having a hook 38 at its end is pivotally secured at 39 adjacent the middle of the switch bar 34, and it will be seen that when the bomb is suspended by the hooked rod 37 its own weight pulls the switch bar 34 against the bias of spring 36 out of contact with the terminal 21 of the battery. Terminal 21 is grounded at 41 and a wire 42 connects switch bar 34 with the transmitter terminal 31, and a wire 43 connects terminal 22 with the transmitter terminal 44.

The transmitter system is shown in detail in Figure 4 and comprises the vacuum tube 13 having the anode 45, cathode 46 and grid 47. Current for heating the filament is supplied from the terminals 23 and 24 of the battery 19, and the plate voltage is supplied by terminals 21 and 22 of the battery, one terminal 21 being connected by wire 48 to the transmitter terminal 33 of the cathode. The other battery terminal 22 is connected by wire 43 to the transmitter terminal 44 which is in turn connected by wire 49 to the parallel connected coil 51 and condenser 52, a wire 53 connects the anode to the other end of condenser 52 and inductance 51 and to antennae 6. The condenser 52 and inductance 51 provide a tuned resonant circuit. By-pass condenser 54 blocks direct current to prevent short circuiting across battery terminals 21, 22 and provides a path for oscillating current in the cathode circuit. The grid resistor 55 provides a direct current path from the grid to cathode to supply suitable bias voltage to the grid from the rectified alternating current flow in the grid circuit. Condenser 56 blocks positive direct current from being impressed on grid 47 from terminal 22. The system is suitable for sending out continuous wave ultra-high frequencies or moderately high frequencies, and the battery can be designed to produce the desired current and potential over a comparatively short time.

As shown in Figure 2, the bomb is suspended in the cockpit 57 in the aeroplane in a tube 58 from the hook 38 which engages the hooked end 59 of a lever 61 pivoted at 62 having an operating handle 63. The opposite end of the lever 61 is connected to the starting button 64 of a stop watch 65 which may be graduated in seconds and fractions of seconds or in units of length. A receiving set 66 having a tuning dial 67 is located in the cockpit and has the ear phones 68 by which the receiving signal may be heard by the pilot. The receiver is designed to receive continuous wave transmission. However, the altimeter transmitter may be provided with suitable wave modulating means and a receiver designed for reception of modulated radio frequency waves may then be employed.

The operation of the apparatus now will be described. When the aviator wishes to determine or check his altitude, he will close the switch bar 27 across the exterior of the binding posts 26 and 29 thereby closing the heating circuit for the cathode 46 of the vacuum tube 13. The spring 36 brings switch bar 34 into contact with the terminal 21 of the battery 19, and when the filament has become heated the transmitter circuit will become operative and send out an oscillating signal of predetermined frequency. The receiver 66 is then tuned to the frequency of this signal which can be heard in the ear phones 68. Having tested the operation of the bomb, it is then placed in the tube 58 suspended by the hook 38 from the hooked end 59 of the lever 61 and the weight of the bomb draws the switch bar 34 out of contact with battery terminal 21 thereby breaking the plate circuit and rendering the transmitter inoperative. To release the bomb the operator draws the operating handle 63 in the direction indicated by the arrow. This releases the bomb for its descent and simultaneously releases the starting button 64 of the stop watch or chronometer which begins to indicate the time interval. The operator listening in the ear phones 68 will hear the signal sent out by the bomb as long as the bomb is falling, and when the bomb strikes the earth or water the weight of the battery and other parts carried by the plates 9 and 14 will force the tube 13 down against the action of springs 11 into contact with the massive nose 2 of the bomb, whereby the vacuum tube will be broken and the transmitter will cease to function. The instant the signal ceases the aviator notes the reading of the stop watch, and from the time interval lapsed by reference to a suitable correcting table, he will be able to determine his altitude. Should the aeroplane be flying over mountainous territory, the indication of the stop watch will advise him of his absolute distance above the point where the bomb falls to earth and from this information he can increase his altitude if necessary to fly over very high protuberances or mountain peaks. This serves as a valuable check in connection with the barometric altimeter, or may be employed alone to determine absolute elevations from the earth. In military aviation during a bombing raid, the accurate determination of altitude enables more accurate aiming of bombs.

I claim:

1. In an apparatus of the character described, for use in determining the altitude of an aircraft carrying a radio receiver, a bomb-like container normally carried by the aircraft but adapted when released to fall freely to the earth's surface and containing a radio frequency transmitting apparatus operable to send a continuous signal for reception by said receiver during the interval of the free fall thereof, means on the aircraft co-operating with the container to initiate operation of said radio frequency apparatus upon dropping of said container, and means responsive to the collision of the container with the earth's surface to disable said radio frequency transmitting apparatus and thereby stop reception of the signal on the aircraft.

2. In an apparatus of the character described, for use in determining the altitude of an aircraft carrying a radio receiver, a bomb-like container normally carried by the aircraft but adapted when released to fall freely to the earth's surface and containing a radio frequency transmitting apparatus operable to send a continuous signal for reception by said receiver during the interval of the free fall thereof, means for suspending said container in inoperative position, a chronometer, means for releasing said container and for initiating operation of said chronometer, and means responsive to the collision of the container with the earth's surface to disable said radio frequency transmitting apparatus and thereby stop reception of the signal on the aircraft.

3. An apparatus for determining the altitude of an aircraft in flight carrying a radio receiver, a chronometer and a launching member, a bomb-like container supported in said member for a free fall to earth and comprising a radio frequency transmitter having means to initiate the sending of a signal to said receiver, transmit said signal during its fall to earth and terminate its transmission at the end of the fall, a device to release the container from said member and thereby initiate operation of said transmitter, a device to start the chronometer and common control means for both said devices.

4. An apparatus for determining the distance between an elevated object and the surface below it comprising a releasable signal emitting device of known falling speed carried by said object, means in said object for rendering signals from said device audible only while falling, means for releasing said device from said object and simultaneously rendering said device operative to emit signals during its fall, means on said device for rendering the same inoperative to emit signals upon landing, and means for observing the time of fall of said device whereby the distance can be computed on the basis of the known falling speed and elapsed time.

5. An apparatus for determining the distance between an elevated object and the surface below it comprising a signal emitting device of known falling speed operable only while falling, means in said object for rendering signals from said device audible, means operable simultaneously for releasing said device from said object and for timing said release, and means for observing the landing of said device through said signal emitting device whereby the distance of fall can be computed on the basis of the known falling speed and elapsed time.

6. An altitude determining means for an airplane in flight comprising a radio signal transmitter of known falling speed, means in said airplane for simultaneously releasing said transmitter and starting the transmitting of radio signals, means in the air plane for receiving the signals, means to stop said signal when said transmitter hits the ground, and time controlled means for indicating the distance of fall of said transmitter by the elapsed time of the transmitted signals.

7. An altitude determining means for an airplane in flight comprising a radio signal transmitter of known falling speed operable only while falling, means in said airplane for simultaneously releasing said transmitter and starting the transmitting of radio signals, means in the airplane for receiving the signals, time controlled means for indicating the distance of fall of said transmitter, means to stop said signal when said transmitter hits the ground, and means for simultaneously releasing said transmitter and starting said indicating means.

8. An altitude determining means for an airplane in flight comprising a radio signal transmitter of known falling speed, means in said airplane for simultaneously releasing said transmitter and starting the transmitting of radio signals, means in the airplane for receiving the signals, time controlled means for indicating the distance of fall of said transmitter, means for simultaneously releasing said transmitter and starting said indicating means, means to stop said signal when said transmitter hits the ground, and a launching tube in said airplane from which said transmitter is released.

9. An altitude determining means for an airplane in flight comprising a radio signal transmitter of known falling speed, a launching tube in said airplane, means for simultaneously releasing said transmitter from said tube and starting the transmitting of radio signals, means to stop said signal when said transmitter hits the ground, means in the airplane for receiving the signals, time controlled means for indicating the distance of fall of said transmitter, means operative upon release of said transmitter for starting said indicating means.

10. An altitude determining means for aircraft in flight comprising supporting and releasing means carried by the aircraft, an object to be released from said aircraft having a radio signal transmitter carried thereby, control apparatus co-operative therewith for simultaneously initiating the release of said object for a free fall and the broadcast of radio signals by said signal transmitter, means associated with said transmitter rendering signals therefrom audible only while falling, a timing device adapted to be started on release of the object, said timing device having a movable indicator and a scale calibrated in distance units, a receiving system on the aircraft, and means for optionally stopping the timing device upon cessation of the received signal whereby the distance traversed by the freely falling object may be observed either by noting the scale reading or the time interval of fall observed for subsequent calculation of the distance.

11. An apparatus for determining the altitude of an aircraft in flight carrying a radio receiver and a launching member, a bomb-like container supported in said member for a fall to earth and comprising a radio frequency transmitter having means to initiate the sending of a signal to said receiver, transmit said signal during its fall to earth and terminate its transmission at the end of the fall, time controlled means for indicating the distance of fall of said container, a device to release the container from said member and thereby initiate operation of said transmitter, and means connected and operable to actuate said device and to start said indicating means.

WILLIAM S. POTTER.